United States Patent [19]

Huang

[11] Patent Number: 5,447,319

[45] Date of Patent: Sep. 5, 1995

[54] ADJUSTING DEVICE OF A BABY-WALKER

[76] Inventor: Li-Chu C. Huang, No. 9, Alley 2, Lane 606, Sec. 2, Po Ai Rd., Chia Yi City, Taiwan

[21] Appl. No.: 332,932

[22] Filed: Oct. 31, 1994

[51] Int. Cl.6 .................. B62B 7/06; A47D 13/04
[52] U.S. Cl. .................. 280/87.051; 280/87.05; 280/649; 297/5; 108/120; 482/68
[58] Field of Search .............. 280/87.05, 87.051, 642, 280/649, 639, 647, 43, 43.17, 43.21; 108/119, 120, 117, 146; 297/5, 6, 56, 344.15; 482/68; 248/188.2

[56] References Cited

U.S. PATENT DOCUMENTS

| | | | |
|---|---|---|---|
| 4,019,756 | 4/1977 | Ishida | 297/5 |
| 4,140,311 | 2/1979 | Murakami | 280/87.05 |
| 4,171,132 | 10/1979 | Kassai | 280/87.05 |
| 4,225,146 | 9/1980 | Takeuchi | 280/87.05 |
| 4,433,869 | 2/1984 | Payne, Jr. et al. | 297/5 |
| 4,576,392 | 3/1986 | Quinlan, Jr. | 280/87.051 |
| 4,615,523 | 10/1986 | Chen | 280/87.05 |
| 4,799,700 | 1/1989 | Knoedler et al. | 280/87.05 |
| 5,324,064 | 6/1994 | Sumser et al. | 280/87.051 |
| 5,351,978 | 10/1994 | Chen | 280/87.051 |

Primary Examiner—Karin L. Tyson
Assistant Examiner—Carla Mattix
Attorney, Agent, or Firm—Gunn, Lee & Miller

[57] ABSTRACT

An adjusting device includes an upper and a lower ring element connected with each other by a pivotal device disposed therebetween, the pivotal device has two pairs of rods cross-pivotally engaged, the upper ring element has a plane portion which has a shoulder formed on an under side, the adjusting device includes a movable element engaged to one pair of rods of the pivotal device, a base engaged to the under side of the plane portion and an operation element pivotally engaged to the base. The movable element has a serrated portion defined in an under side and the base has an opening defined therein corresponding to the serrated portion of the movable element. The operation element has a vertical portion and a horizontal portion which is pivotally engaged to an under side of the base with a spring disposed therebetween and a distal end has a serrated portion defined therein to engage to the serrated portion of the movable element via the opening of the base the horizontal portion has an operation bar transversely and slidably engaged therethrough and a block is engaged to an upper surface of the operation bar and has a resilient element disposed between the vertical portion of the operation element and the block which contacts the under side of the plane portion such that the serrated portion of operation element is disengaged from the serrated portion of the movable element by pulling the operation bar outwardly from the vertical portion and then lifting the operation bar upwardly.

3 Claims, 5 Drawing Sheets

ADJUSTING DEVICE OF A BABY-WALKER

BACKGROUND OF THE INVENTION

The present invention relates to an adjusting device of a baby-walker and, more particularly to an adjusting device which is operated by two actions with different directions.

There are kinds of baby-walkers having an adjusting device which is designed to adjust a height of the baby-walker for babies of different heights so that they may practice how to walk, the adjusting device is operated by an action of pushing a rod or a button downwardly such that a secured status of the baby-walker is released and then a new height of the baby-walker can be set.

However, it is very dangerous if a child or the baby pushes the rod or the button unintentionally to release the secured status of the baby-walker, and because there needs only one action to operate the adjusting device so there exists a high risk to depend on the baby not to push the rod or the button.

The present invention intends to provide an adjusting device which is operated by pulling an operation bar outwardly first and then lifting the operation bar upwardly so as to prevent a baby in the baby-walker from operating the adjusting device unintentionally to release the secured status of the baby-walker so as to mitigate and/or obviate the above-mentioned problems.

SUMMARY OF THE INVENTION

The present invention provides an adjusting device which has a movable element engaged to a pair of rods of a pivotal device which pivotally connects an upper ring element to a lower ring element of the baby-walker, the movable element has a serrated portion defined in an under side thereof, a base fixedly engaged to an under side of the upper ring element for the movable element being slid thereon and having an opening defined therein corresponding to the serrated portion of the movable element and an operation element having a vertical portion and a horizontal portion which is pivotally engaged to an under side of the base by a spring disposed therebetween and having a serrated portion formed therein which is engaged to the serrated portion of the movable element via the opening of the base, the vertical portion has an operation bar slidably and transversely inserted therethrough, a block is fixedly engaged to an upper surface thereof and contacts the under side of the upper ring element, a resilient element is disposed between the vertical portion and the block such that the serrated portion of the operation element is disengaged from the serrated portion of the movable element by pulling the operation bar outwardly from the vertical portion and then lifting the operation bar upwardly.

It is an object of the present invention to provide an adjusting device of a baby-walker, which is operated by two different actions with different directions.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
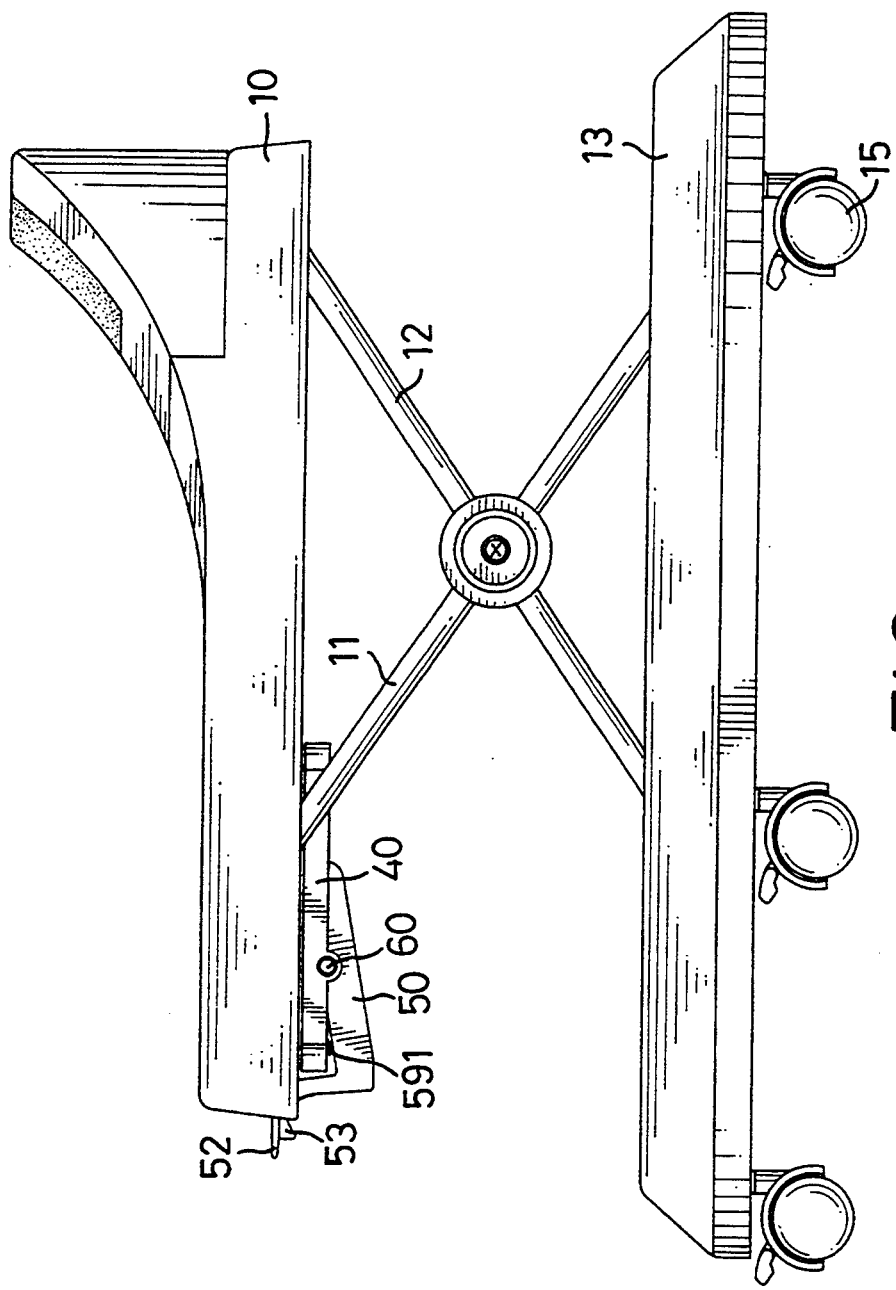
FIG. 1 is a side elevational view of a baby-walker with an adjusting device disposed thereto.
Figure 2:
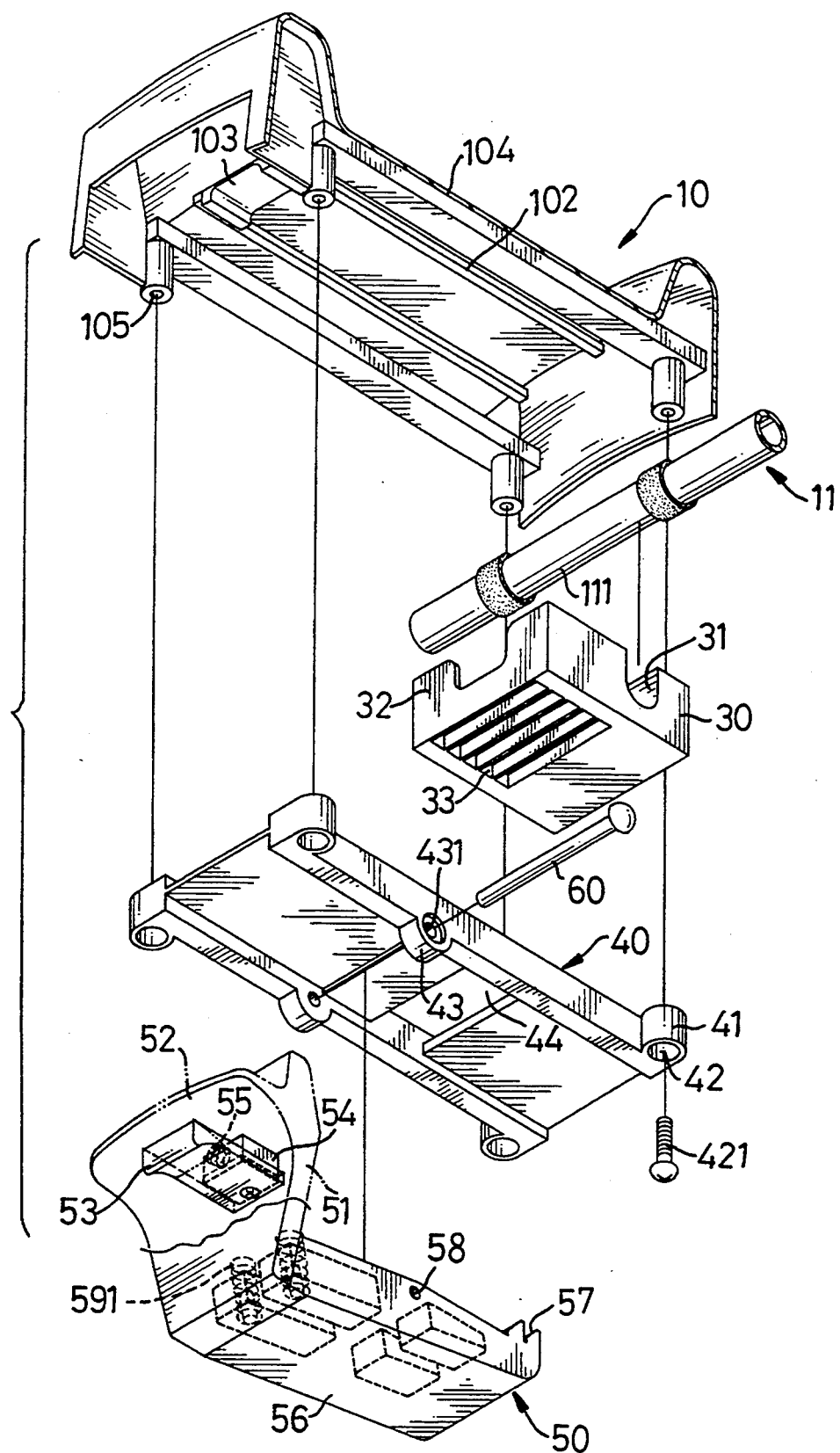
FIG. 2 is an exploded view of the adjusting device in accordance with the present invention.
Figure 3:
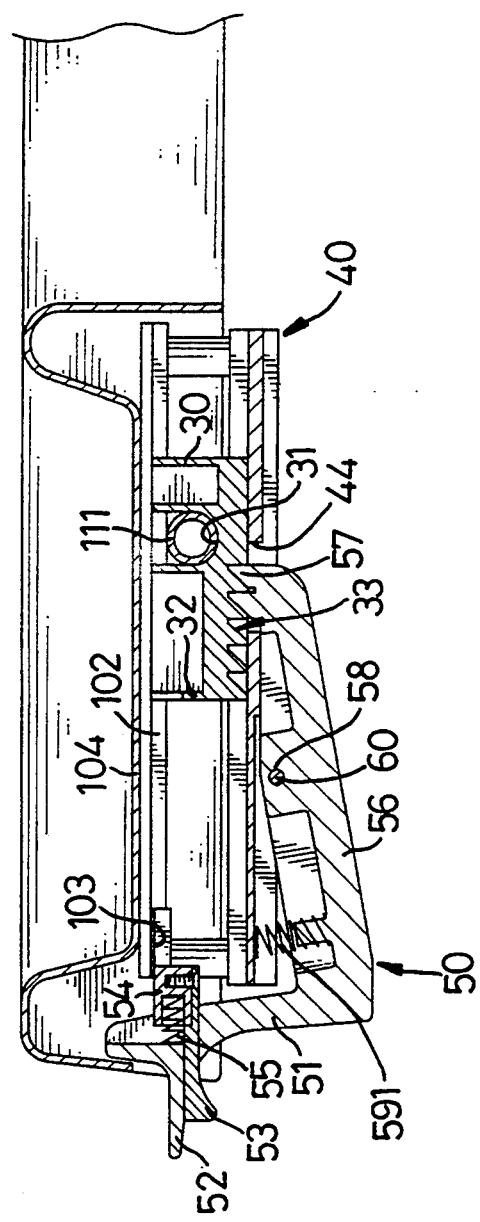
FIG. 3 is a side elevational view, partly in section, of the adjusting device in accordance with the present invention.
Figure 4:
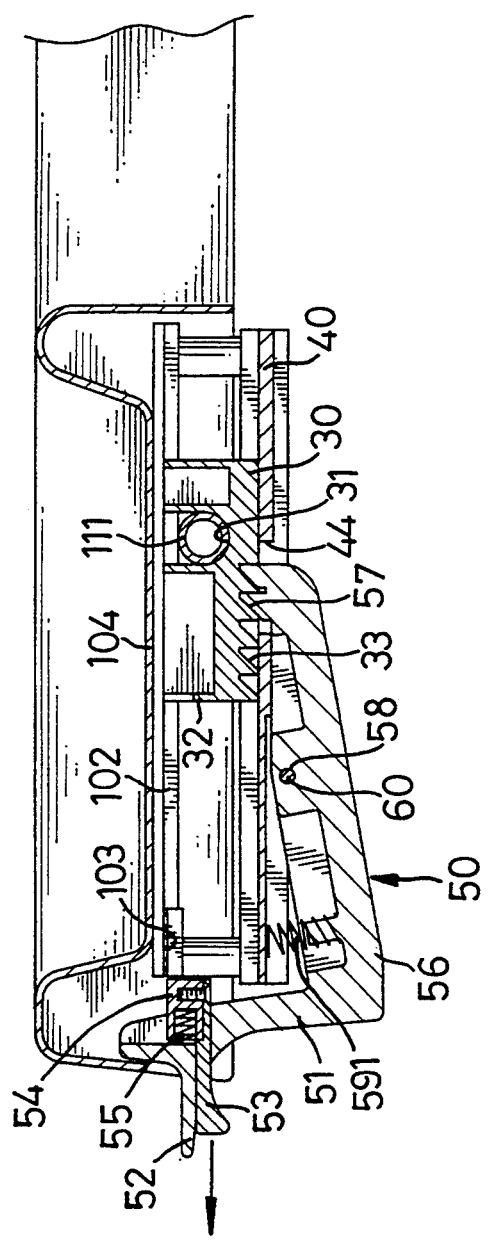
FIG. 4 is a view similar to FIG. 3 showing an action of pulling an operation bar outwardly from a vertical portion of an operation element.
Figure 5:
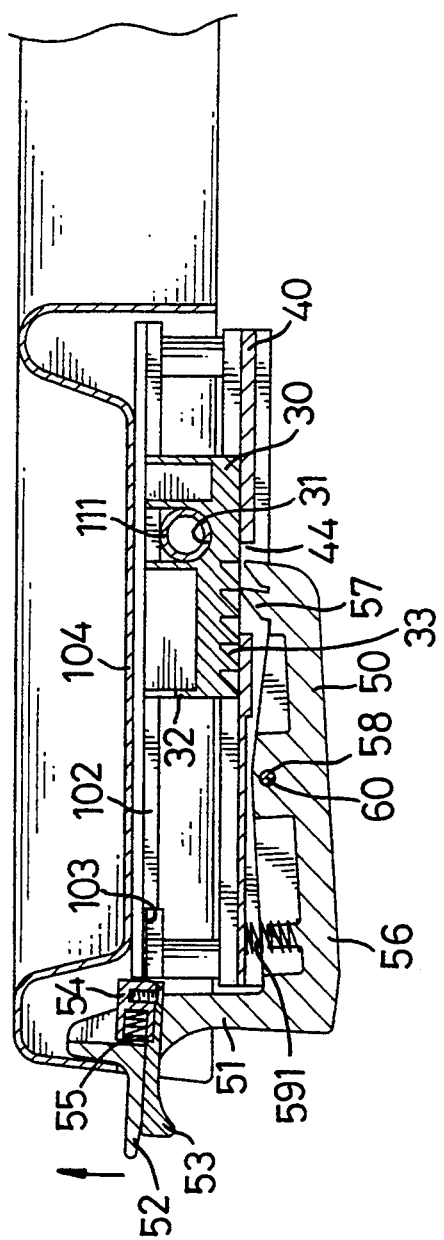
FIG. 5 is a side elevational view, partly in section, showing the operation bar is lifted upwardly and an engagement between the serrated portions of an operation element and the movable element is released.

Referring to the drawings and initially to FIGS. 1 through 3, an adjusting device for a baby-walker in accordance with the present invention generally includes a movable element 30, a base 40 and an operation element 50 disposed to an upper ring element 10 of the baby-walker. The baby-walker generally includes the upper ring element 10 which has a plane portion 104 extending horizontally and inwardly from a periphery thereof and a lower ring element 13 which has a plurality of wheels 15 rotatably engaged to an under side thereof, the upper and lower ring elements 10, 13 are connected by a pivotal device connected therebetween which are controlled to set a height between the upper and lower ring elements 10, 13 by an adjusting device disposed to an under side of the upper ring element 10.

The pivotal device comprises a frame 11 which has a U-shaped configuration and a pair of rods 12, each rod 12 is pivotally engaged to a respective leg of the frame 11 to form a cross-pivotal engagement, the U-shaped frame 11 has a transverse portion 111 received in the movable element 30 abutting an under side of the plane portion 104 of the upper ring element 10, and the distal ends of the two legs thereof are pivotally connected to the lower ring element 13, each of the rods 12 has two ends respectively connected to the upper and lower ring elements 10, 13.

The movable element 30 has four vertical walls, each two opposite walls thereof has a recess 31 defined therein for receiving the transverse portion 111 of the first frame 11 therein and a serrated portion 33 is formed in an under side of the movable element 30, two separated protrusions 32 extend from the other two opposite vertical walls thereof for moving along two rails 102 extending downwardly from the under side of the plane portion 104.

The base 40 is a substantially rectangular plate which has an opening 44 defined therein corresponding to the serrated portion 33 of the movable element 30 and four tubular parts 41 are formed on each corner thereof and each tubular part 41 has a hole 42 extending vertically defined therein, the base 40 is securely engaged to the under side of the plane portion 104 by threading a bolt 421 through the holes 42 and engaged to four threaded holes 105 defined in the under side of the plane portion 104 so as to maintain the movable element 30 and the transverse portion 111 received therein slidably disposed between the base 40 and the plane portion 104. A lug 43 extends downwardly from each two opposite sides of an under side of the base 40, each protrusion 43 has a hole 431 defined transversely therein.

An L-shaped operation element 50 has a vertical and a horizontal portion 51, 56, the horizontal portion 56 thereof has two side walls extending upwardly therefrom in each of which a hole 58 is defined for pivotal engagement to the base 40 by a pin 60 inserted through the holes 431 and 58 such that the base 40 is partially disposed on the horizontal portion 56, a distal end of the horizontal portion 56 has a serrated portion 57 formed upwardly therefrom so as to engage to the serrated portion 33 of the movable element 30 via the opening 44. A pair of resilient elements 591 are disposed on an upper side of the horizontal portion 56 between the vertical portion 51 and the pin 60 corresponding to the serrated portion 57 and between the horizontal portion 56 of the operation element 50 and the under side of the base 40. An operation bar 53 has first and second ends and is slidably and transversely engaged through the vertical portion 51 such that the first end thereof extends from the vertical portion 51 and the second end thereof extends toward the movable element 30, a block 54 is fixedly engaged to an upper surface of the second end of the operation bar 53 and a spring 55 is disposed between the block 54 and the vertical portion 51 such that when the operation bar 53 is pulled outward from the vertical portion 51, the spring 55 is compressed by the block 54 and the vertical portion 51 and the block 54 is moved a distance. A transverse protrusion 52 extends transversely from the vertical portion 51 such that the first end of the operation bar 53 is located beneath the transverse protrusion 52. The block 54 has an upper surface contacting a shoulder 103 formed in the under side of the plane portion 104 such that the vertical portion 51 cannot be lifted up when the operation bar 53 is not pulled out.

Therefore, when adjusting a height of the baby-walker, a user pulls the first end of the operation bar 53 to move the block 54 from contacting the shoulder 103 and then lifts the operation bar 53 or the transverse protrusion 52 upwardly such that the serrated portion 57 of the operation element 50 is disengaged from the serrated portion 33 of the movable element 30 to release the secured status so as to adjust a new height of the upper and lower ring elements 10, 13.

Accordingly, the adjusting device in accordance with the present invention is operated by two actions which have different directions so as to prevent babies from releasing the secured status of the baby-walker.

Although the invention has been explained in relation to its preferred embodiment, it is to be understood that many other possible modifications and variations can be made without departing from the spirit and scope of the invention as hereinafter claimed.

I claim:

1. An adjusting device for a baby-walker, said baby-walker including an upper ring element and a lower ring element, said upper and lower ring elements connected by a pivotal device connected therebetween and said adjusting device disposed to an under side of said upper ring element to control said pivotal device to be set at a height between said upper and lower ring elements, said upper ring element having a plane portion extending horizontally and inwardly from a periphery thereof, said lower ring element having a plurality of wheels rotatably engaged to an under side thereof;

said pivotal device comprising a frame being a U-shaped configuration and two rods, each said rod pivotally engaged to a respective leg of said U-shaped frame, said U-shaped frame having a transverse portion slidably engaged to an under side of said plane portion of said upper ring element and the distal ends of the two legs thereof connected to said lower ring element, each said rod having two ends respectively connected to said upper and lower ring element;

said adjusting device comprising:

a movable element, said movable element having four vertical walls and two opposite walls thereof having a recess defined therein for receiving said transverse portion of said frame therein and a serrated portion is formed in an under side thereof;

a base being a plate and said movable element disposed thereon and having an opening defined therein corresponding to said serrated portion of said movable element, said base securely engaged to said under side of said plane portion so as to permit said movable element to slide thereon;

an L-shaped operation element having a vertical and a horizontal portion, said horizontal portion thereof pivotally engaged to said base such that said base is disposed on said horizontal portion, a distal end of said horizontal portion having a serrated portion formed upwardly therefrom so as to engage to said serrated portion of said movable element via said opening of said base, a resilient element disposed between said horizontal portion of said operation element and an under side of said base, an operation bar having first and second ends and slidably and transversely engaged through said vertical portion such that said first end thereof extending outwardly from said vertical portion of said operation element and said second end thereof extending toward said movable element, a block fixedly engaged to an upper surface of said second end of said operation bar and a spring disposed between said block and said vertical portion, said block having an upper surface contacting a shoulder formed in said under side of said plane portion such that said serrated portion of said operation element is disengaged from said serrated portion of said movable element when said operation bar is pulled horizontally to move said block disengaged from said shoulder of said plane portion and then lifting said operation bar upwardly.

2. The adjusting device as claimed in claim 1 wherein said under side of said plane portion has two rails extending downwardly therefrom and said movable element has at least two protrusions extending upwardly therefrom so as to provide a guidance when said protrusions of said movable element are slid along said rails.

3. The adjusting device as claimed in claim 1 wherein said operation element has two side walls extending from said horizontal portion and each said side wall has a hole defined transversely therein, said base has a lug extending downwardly from an under side thereof, each lug thereof has a hole defined therein such that said operation element is pivotally engaged to said base by a pin inserted through said holes of said operation element and said holes of said lugs of said base.

* * * * *